April 25, 1933.  W. F. McMAHON  1,905,181
PUMP PISTON
Filed March 18, 1929
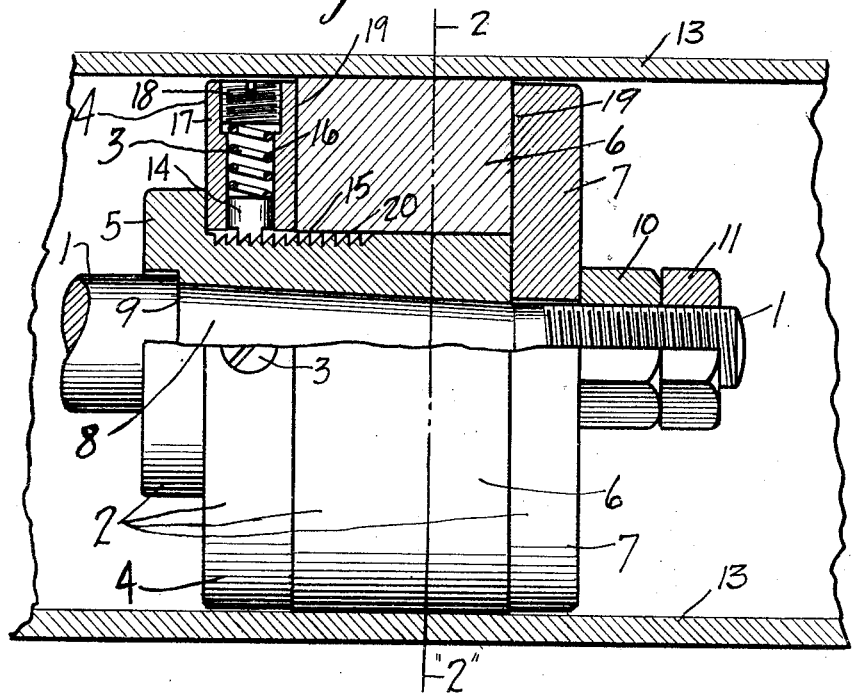
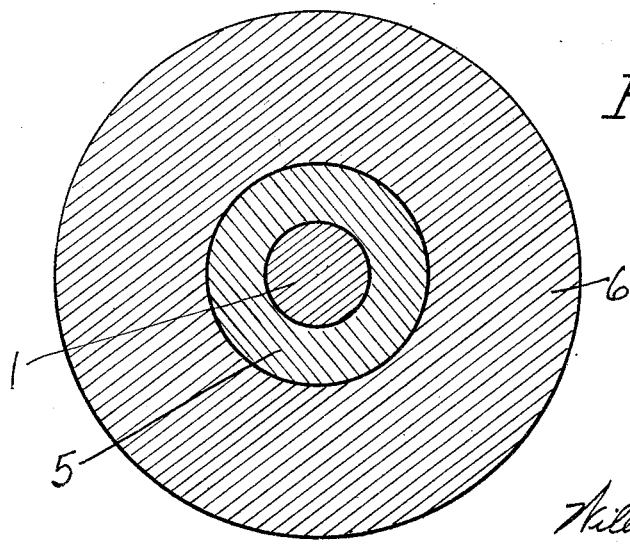
William Frederick McMahon INVENTOR.

Patented Apr. 25, 1933

1,905,181

UNITED STATES PATENT OFFICE

WILLIAM FREDERICK McMAHON, OF RIVERSIDE, CALIFORNIA

PUMP PISTON

Application filed March 18, 1929. Serial No. 347,904.

This invention relates to a novel construction for expanding the piston packing of a fluid pump piston, of a reciprocating pump, and has for its object to provide a piston packing adjusting means, coacting with the fluid pressure of the reciprocating pump, that will efficiently and automatically adjust the piston packing.

Another object is the novel construction provided to enable the manual adjustment of the adjusting means so that the fluid pressure can be used in the adjustment of the piston packing without causing excessive pressure between the piston packing and the water liner of the pump in which the said piston reciprocates.

A further object is to provide a novel ratchet mechanism that will automatically hold the piston packing in place after each fluid pressure adjustment.

With these and other objects in view, the invention resides and consists in the construction and novel combination and arrangement of parts hereinafter more fully described, illustrated in the accompanying drawing, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawing forming a part of this specification and upon which, Figure 1 is a central longitudinal section through my improved piston construction, showing the ratchet mechanism in detail.

Figure 2 is a transverse section through the piston at "2—2", showing the general formation of the piston packing and its adjacent mechanism.

Referring in detail to the characters of reference marked upon the drawing, 1 represents the piston rod of a pump that connects the steam piston with the water piston or the power mechanism with the water piston 2. It is onto this piston rod 1 that I secure my piston unit 2 which consists of a ratchet mechanism 3, follower 4, adapter 5, rubber sleeve 6, and piston member 7.

It may be well to note that my improved piston 2 can be used in any kind of reciprocating pumps namely, steam driven, power or electric driven and/or gas fluid driven pumps. Also this type of piston can be used to pump water or any other kind of fluid.

By referring to Figure 1, it may be seen that the adapter 5 and the piston member 7 is secured in a fixed position upon the piston rod 1 by means of the taper formation 8 of the piston rod 1 and shoulder 9 being utilized to prevent the said adapter 5 and member 7 from moving in a longitudinal movement when the nut 10 and locknut 11 are drawn up hard against the said element or member 7, the said nuts 10 and 11 having threaded engagement with the piston rod 1.

The piston packing 6, which is made of a pliable material preferably of a rubber composition, is automatically compressed and expanded when the piston unit 2 is drawn in a direction toward the steam end of pump by the action of the fluid pressure in the pump against the exposed area of the follower 4. This said fluid pressure action moves the follower 4 in a longitudinal movement toward the member 6 and my ratchet mechanism 3 holds this follower 4 against reverse movement, thereby keeping the piston packing 6 sufficiently pressed against the water liner 13. I desire to have noted, at this time, that my packing 6 will not become anchored in the cylinder or water liner in which the piston 2, of which the said packing 6 is a part thereof, most positively reciprocate with a minimum frictional resistance. Heretofore the main trouble with a fluid type piston was a so called freezing action of the piston packing against the water liner of the pump. This action was caused by the fact that there were no means provided to neutralize the fluid pressure conditions that would be encountered in the respective pump in which the piston was placed. To overcome this objectionable feature I have provided a novel rachet mechanism 3 in which a pawl 14 engages with ratchet teeth 15 in an adapter 5. When I know the maximum pressure that will be exerted in the water fluid end of the pump I can, by adjusting the spring 16, exert a pressure upon the engagement between the said pawl 14 and adapter 5 that will in turn neutralize the pressure by the fluid upon the exposed area 17 of the follower 4 and make a harmonized pressure between the follower 4 and packing 6 so that excessive pressure between the packing 6 and water liner 13 will be eliminated and the mechanical efficiency of the pump not impaired.

This adjustment of my ratchet mechanism 3 will obviously be made before the piston 2 is installed in the pump.

I wish to have it noted that while I have shown the movable member 4 of the piston 2 on the side toward the steam end of the pump it may be reversed and placed upon the opposite end side by merely modifying the construction and used to equally good advantage.

It may be well to note that I provide one or more ratchet mechanisms 3 in member element 4. This ratchet mechanism 3 can be made of any kind of construction but is preferably made of a plunger 14, spring 16 and set-screw 18, the plunger having teeth on one end portion and said plunger 14 being movable in the follower 4. To adjust the pressure between the plunger 14 and the adapter 5 I merely screw the setscrew 18 down upon the spring 16 which in turn causes a spring pressure action upon the said plunger 14.

Piston member 7 is a cylindrical disc adapted to be placed on one end of the piston rod 1 and it is fixed against longitudinal movement. If desired this member 7 can have threaded engagement with rod 1.

Piston packing 6 is a hollow cylindrical formation made of pliable material and while I have shown flat end surfaces these end surfaces 19 can be made of any shape or formation that may be desired.

Adapter 5 is formed as a hollow cylinder having a tapered inner bore with a tooth formation on its outer diameter 20 and a raised shoulder provided to keep the follower 4 in position.

Piston follower 4 is a cylindrical disc adapted to contain one or more ratchet mechanisms 3 and it is made to permit movement upon the adapter 5.

Should the shape of ends of the packing 6 be modified other than that shown, the shape of the adjacent surfaces 19 of the elements 4 and 7 will be modified to suit.

From the above description it will be observed that I have provided a novel construction, whereby the fluid pressure in the pump is utilized to automatically adjust the piston packing in a piston and means is provided to neutralize the force exerted by the said pump fluid relative to the said piston packing.

What I claim and desire to secure by Letters Patent is:

1. In a mechanism adapted to create a pressure upon a fluid, a pump piston adapted to move in a reciprocating movement, a piston member and a piston follower adapted to be moved toward said member, a pliable packing between said member and follower, means for utilizing the fluid pressure to impart longitudinal movement to said follower to compress and expand the said packing and a ratchet mechanism adapted to hold the pliable packing in a compressed and expanded state without pulsating action on each reciprocating movement of the piston.

2. In a reciprocating pump adapted to create a pressure upon a fluid, a pump piston comprising a pliable packing adapted to be actuated by a fluid pressure, a ratchet mechanism adapted to hold the pliable packing in a compressed and expanded state without a pulsating action on the packing on each reciprocating movement of the piston.

3. In a reciprocating pump, a pump piston comprising a piston packing adapted to be actuated by a fluid pressure, two cylindrical discs, a pliable packing between said cylindrical discs, an adapter, a ratchet mechanism, one of said cylindrical discs adapted to move in a longitudinal direction upon said adapter, said longitudinal movement caused by fluid pressure acting against said cylindrical disc whereby, the piston packing is compressed and expanded, said ratchet mechanism adapted to cause friction between the adapter and movable cylindrical disc.

4. In a mechanism adapted to create a pressure on a fluid, a pump piston adapted to be actuated by a fluid pressure, a pliable packing adapted to be compressed and expanded by fluid pressure, means for utilizing the fluid pressure to actuate said packing, said means adapted to hold the pliable packing in its compressed state after the fluid pressure has so compressed the said packing on one of the reciprocating movements of the piston.

5. A piston comprising a sleeve having ratchet teeth thereon, an expansible packing ring surrounding said sleeve, an abutment against which one end of said packing abuts, and a plunger follower carrying spring pressed ratchets contacting the opposite end of said packing, the said ratchets having teeth complementary to and engaging the teeth on said sleeve whereby fluid pressure acting on the said follower will cause the same to move axially on said sleeve to compress and expand said packing, the said spring pressed ratchets functioning automatically to maintain said packing in an expanded condition.

WILLIAM FREDERICK McMAHON.